(12) United States Patent
Homma et al.

(10) Patent No.: US 8,989,543 B2
(45) Date of Patent: Mar. 24, 2015

(54) OPTICAL CABLE

(71) Applicant: Sumitomo Electric Industries, Ltd., Osaka-shi, Osaka (JP)

(72) Inventors: Yuya Homma, Yokohama (JP); Itaru Sakabe, Yokohama (JP); Kazuyuki Sohma, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 146 days.

(21) Appl. No.: 13/677,698

(22) Filed: Nov. 15, 2012

(65) Prior Publication Data

US 2013/0129288 A1    May 23, 2013

(30) Foreign Application Priority Data

Nov. 17, 2011  (JP) .................................. 2011-251399
Aug. 9, 2012  (JP) .................................. 2012-177212

(51) Int. Cl.
*G02B 6/44*    (2006.01)

(52) U.S. Cl.
CPC ............ *G02B 6/4403* (2013.01); *G02B 6/4401* (2013.01); *G02B 6/4416* (2013.01); *G02B 6/443* (2013.01)
USPC ........... 385/114; 385/102; 385/104; 385/106; 385/109; 385/113

(58) Field of Classification Search
CPC .. G02B 6/4403; G02B 6/4494; G02B 6/4411; G02B 6/3885; G02B 6/4433; G02B 6/44
USPC ......... 385/100, 102, 104, 106, 109, 113, 114, 385/115
See application file for complete search history.

(56) References Cited

U.S. PATENT DOCUMENTS 6,097,866 A * 8/2000 Yang et al. .................... 385/114

FOREIGN PATENT DOCUMENTS

| JP | 60-165918 U | 11/1985 |
|---|---|---|
| JP | 62-46414 U | 3/1987 |
| JP | H7-141928 | 6/1995 |
| JP | 09-080279 A | 3/1997 |
| JP | H11-03892 | 2/1999 |
| JP | 2011-085854 A | 4/2011 |

* cited by examiner

*Primary Examiner* — Jennifer Doan
(74) *Attorney, Agent, or Firm* — Drinker Biddle & Reath LLP

(57) ABSTRACT

An optical cable comprises an optical fiber ribbon, a tension member and a sheath. The optical fiber ribbon is constructed by integrating a plurality of optical fibers arranged in parallel. The sheath is provided so as to surround the optical fiber ribbon. The sheath is used for protecting the optical cable. One optical fiber ribbon is arranged twistably within an inner space surrounded by the sheath.

18 Claims, 17 Drawing Sheets

Fig. 10

|  |  | Example | | | | | | | | |
|---|---|---|---|---|---|---|---|---|---|---|
|  |  | 1 | 2 | 3 | 4 | 5 | 6 | 7 | 8 | 9 |
| Optical fiber | Fiber type | HPCF | HPCF | HPCF | HPCF | HPCF | HPCF | HPCF | HPCF | HPCF |
|  | NA | 0.30 | 0.30 | 0.30 | 0.30 | 0.25 | 0.37 | 0.45 | 0.30 | 0.30 |
|  | Core diameter[μm] | 80 | 80 | 80 | 80 | 80 | 80 | 80 | 60 | 100 |
|  | Cladding diameter[μm] | 125 | 125 | 125 | 125 | 125 | 125 | 125 | 125 | 125 |
|  | Primary coating diameter[μm] | – | – | 200 | 200 | – | – | – | – | – |
|  | Secondary coating diameter[μm] | – | – | 245 | 245 | – | – | – | – | – |
|  | 4-core ribbon size T × W[mm] | 0.2×0.6 | 0.2×0.6 | 0.3×1.1 | 0.3×1.1 | 0.2×0.6 | 0.2×0.6 | 0.2×0.6 | 0.2×0.6 | 0.2×0.6 |
| Cable | Cable structure | TypeA | TypeB | TypeA | TypeB | TypeB | TypeB | TypeB | TypeB | TypeB |
|  | Inner tube inner diameter[mm] | – | 1.0 | – | 1.5 | 1.0 | 1.0 | 1.0 | 1.0 | 1.0 |
|  | Inner tube outer diameter[mm] | – | 2.0 | – | 2.5 | 2.0 | 2.0 | 2.0 | 2.0 | 2.0 |
|  | Inner tube material | – | PVC | – | PVC | PVC | PVC | PVC | PVC | PVC |
|  | Inner tube elasticity modulus[MPa] | – | 100 | – | 100 | 100 | 100 | 100 | 100 | 100 |
|  | Sheath inner diameter[mm] | 1.6 | 3.2 | 1.6 | 3.5 | 3.2 | 3.2 | 3.2 | 3.2 | 3.2 |
|  | Sheath outer diameter[mm] | 3.6 | 4.2 | 3.6 | 4.5 | 4.2 | 4.2 | 4.2 | 4.2 | 4.2 |
|  | Kevlar amount[d] | 4560 | 4560 | 4560 | 4560 | 4560 | 4560 | 4560 | 4560 | 4560 |
| Evaluation | Lateral pressure[dB] | 0.10 | 0.05 | 0.08 | 0.04 | 0.14 | 0.03 | 0.01 | 0.10 | 0.04 |
|  | Rupture strength | good | good | good | good | good | good | good | good | good |
|  | Bending[dB] | 0.10 | 0.10 | 0.10 | 0.10 | 0.25 | 0.05 | 0.01 | 0.12 | 0.08 |

Fig.11

|  |  | Example | | | | | | | |
|---|---|---|---|---|---|---|---|---|---|
|  |  | 10 | 11 | 12 | 13 | 14 | 15 | 16 | 17 |
| Optical fiber | Fiber type | HPCF | HPCF | AGF | AGF | AGF | AGF | HPCF | AGF |
|  | NA | 0.30 | 0.30 | 0.30 | 0.30 | 0.30 | 0.30 | 0.37 | 0.21 |
|  | Core diameter[μm] | 80 | 80 | 80 | 80 | 80 | 80 | 200 | 50 |
|  | Cladding diameter[μm] | 125 | 125 | 125 | 125 | 125 | 125 | 230 | 125 |
|  | Primary coating diameter[μm] | – | – | – | – | 200 | 200 | – | – |
|  | Secondary coating diameter[μm] | – | – | – | – | 245 | 245 | – | – |
|  | 4-core ribbon size T×W[mm] | 0.2×0.6 | 0.2×0.6 | 0.2×0.6 | 0.2×0.6 | 0.3×1.1 | 0.3×1.1 | 0.3×1.1 | 0.2×0.6 |
| Cable | Cable structure | TypeA | TypeA | TypeA | TypeB | TypeA | TypeB | TypeB | TypeB |
|  | Inner tube inner diameter[mm] | – | – | – | 1.0 | – | 1.5 | 1.5 | 1.0 |
|  | Inner tube outer diameter[mm] | – | – | – | 2.0 | – | 2.5 | 2.5 | 2.0 |
|  | Inner tube material | – | – | – | PVC | – | PVC | PVC | PVC |
|  | Inner tube elasticity modulus[MPa] | – | – | – | 100 | – | 100 | 100 | 100 |
|  | Sheath inner diameter[mm] | 3.2 | 1.6 | 1.6 | 3.2 | 1.6 | 3.5 | 3.5 | 3.2 |
|  | Sheath outer diameter[mm] | 4.2 | 3.6 | 3.6 | 4.2 | 3.6 | 4.5 | 4.5 | 4.2 |
|  | Kevlar amount[d] | 4560 | 9120 | 2400 | 4560 | 4560 | 4560 | 4560 | 4560 |
| Evaluation | Lateral pressure[dB] | 0.05 | 0.30 | 0.09 | 0.04 | 0.07 | 0.03 | 0.01 | 0.40 |
|  | Rupture strength | good | good | fair | fair | fair | fair | poor | fair |
|  | Bending[dB] | 0.09 | 0.10 | 0.10 | 0.10 | 0.10 | 0.10 | 0.05 | 1.6 |

Fig.12

|  |  | Comparative Example | | | | | |
|---|---|---|---|---|---|---|---|
|  |  | 1 | 2 | 3 | 4 | 5 | 6 |
| Optical fiber | Fiber type | HPCF | HPCF | AGF | AGF | AGF | HPCF |
|  | NA | 0.30 | 0.30 | 0.30 | 0.30 | 0.21 | 0.30 |
|  | Core diameter[μm] | 80 | 80 | 80 | 80 | 50 | 80 |
|  | Cladding diameter[μm] | 125 | 125 | 125 | 125 | 125 | 125 |
|  | Primary coating diameter[μm] | – | – | – | – | – | 200 |
|  | Secondary coating diameter[μm] | – | – | – | – | – | 245 |
|  | 4-core ribbon size T × W[mm] | single core × 4 | single core × 4 | single core × 4 | single core × 4 | single core × 4 | 0.3 × 1.1 |
| Cable | Cable structure | TypeA | TypeB | TypeA | TypeB | TypeB | TypeB |
|  | Inner tube inner diameter[mm] | – | 1.0 | – | 1.0 | 1.0 | 1.15 |
|  | Inner tube outer diameter[mm] | – | 2.0 | – | 2.0 | 2.0 | 2.5 |
|  | Inner tube material | – | PVC | – | PVC | PVC | PVC |
|  | Inner tube elasticity modulus[MPa] | – | 100 | – | 100 | 100 | 100 |
|  | Sheath inner diameter[mm] | 1.6 | 3.2 | 1.6 | 3.2 | 3.2 | 3.5 |
|  | Sheath outer diameter[mm] | 3.6 | 4.2 | 3.6 | 4.2 | 4.2 | 4.5 |
|  | Kevlar amount[d] | 4560 | 4560 | 4560 | 4560 | 4560 | – |
| Evaluation | Lateral pressure[dB] | 10.0 | 9.5 | 4.0 | 3.5 | 14.6 | 0.70 |
|  | Rupture strength | good | good | fair | fair | fair | good |
|  | Bending[dB] | 0.10 | 0.10 | 0.10 | 0.10 | 1.6 | 3.3 |

Fig.14

|  |  | Example 21 | Example 22 | Example 23 | Example 24 | Example 25 | Example 26 |
|---|---|---|---|---|---|---|---|
| Cable structure | | 1A | 1A | 1A | 1A | 1A | 1C |
| Sheath | Outer diameter[mm] | 4.2 | 4.2 | 4.2 | 4.2 | 4.2 | 4.2 |
| | Inner diameter[mm] | 3.4 | 3.4 | 3.4 | 3.4 | 3.4 | 3.4 |
| Tube | Outer diameter[mm] | 2.0 | 2.0 | 2.0 | 2.0 | 2.0 | 2.0 |
| | Inner diameter[mm] | 1.0 | 1.0 | 1.0 | 1.0 | 1.0 | 1.0 |
| Tension member | Amount[d] | 4500 | 8000 | 600 | 1400 | 5900 | 4500 |
| | $S_{Te}/S_{Tu}$[%] | 44 | 79 | 6 | 14 | 58 | 44 |
| Optical fiber | Type | HPCF | HPCF | HPCF | HPCF | HPCF | HPCF |
| | NA | 0.29 | 0.29 | 0.29 | 0.29 | 0.29 | 0.29 |
| | Core diameter[μm] | 80 | 80 | 80 | 80 | 80 | 80 |
| | Cladding diameter[μm] | 125 | 125 | 125 | 125 | 125 | 125 |
| | Primary coating diameter[μm] | - | - | - | - | - | - |
| | Secondary coating diameter[μm] | - | - | - | - | - | - |
| | Ink diameter[μm] | 135 | 135 | 135 | 135 | 135 | 135 |
| Ribbon optical fiber | Width[mm] | 0.60 | 0.60 | 0.60 | 0.60 | 0.60 | 0.60 |
| | Thickness[mm] | 0.18 | 0.18 | 0.18 | 0.18 | 0.18 | 0.18 |
| Evaluation results | Impact test | good 0.29dB | good 0.18dB | fair 0.80dB | good 0.40dB | good 0.22dB | good 0.20dB |
| | Tensile strength test | good 0.05dB | good 0.03dB | good 0.46dB | good 0.15dB | good 0.05dB | good 0.05dB |
| | Bending test | good 0.12dB | good 0.14dB | good 0.11dB | good 0.12dB | good 0.12dB | good 0.07dB |
| | Compressive strength test | good 0.12dB | good 0.11dB | good 0.11dB | good 0.12dB | good 0.12dB | good 0.10dB |
| | Pinch test | good | good | good | good | good | good |
| | Initial optical characteristic | good 8dB/km | fair 15dB/km | good 5dB/km | good 6dB/km | good 9dB/km | good 8dB/km |
| | Cable stiffness | good | good | good | good | good | good |

Fig.15

| | | Example 27 | Example 28 | Example 29 | Example 30 |
|---|---|---|---|---|---|
| Cable structure | | 1A | 1A | 1A | 1A |
| Sheath | Outer diameter[mm] | 4.2 | 4.2 | 4.2 | 4.2 |
| | Inner diameter[mm] | 3.4 | 3.4 | 3.4 | 3.4 |
| Tube | Outer diameter[mm] | 2.0 | 2.0 | 2.0 | 2.0 |
| | Inner diameter[mm] | 1.4 | 1.0 | 1.0 | 1.0 |
| Tension member | Amount[d] | 4500 | 4500 | 4500 | 4500 |
| | $S_{Te}/S_{Tu}$[%] | 23 | 44 | 44 | 44 |
| Optical fiber | Type | HPCF | HPCF | HPCF | HPCF |
| | NA | 0.29 | 0.43 | 0.29 | 0.29 |
| | Core diameter[μm] | 80 | 80 | 60 | 100 |
| | Cladding diameter[μm] | 125 | 125 | 125 | 125 |
| | Primary coating diameter[μm] | 200 | - | - | - |
| | Secondary coating diameter[μm] | 245 | - | - | - |
| | Ink diameter[μm] | 260 | 135 | 135 | 135 |
| Ribbon optical fiber | Width[mm] | 1.10 | 0.60 | 0.60 | 0.60 |
| | Thickness[mm] | 0.30 | 0.18 | 0.18 | 0.18 |
| Evaluation results | Impact test | good 0.35dB | good 0.24dB | good 0.25dB | good 0.22dB |
| | Tensile strength test | good 0.05dB | good 0.03dB | good 0.06dB | good 0.05dB |
| | Bending test | good 0.12dB | good 0.02dB | good 0.12dB | good 0.11dB |
| | Compressive strength test | good 0.07dB | good 0.03dB | good 0.14dB | good 0.10dB |
| | Pinch test | good | good | good | good |
| | Initial optical characteristic | good 5dB/km | good 5dB/km | good 8dB/km | good 8dB/km |
| | Cable stiffness | good | good | good | good |

Fig.16

| | | Example 31 | Example 32 | Example 33 | Example 34 |
|---|---|---|---|---|---|
| Cable structure | | 1A | 1A | 1A | 1A |
| Sheath | Outer diameter[mm] | 4.2 | 4.2 | 4.2 | 6.0 |
| | Inner diameter[mm] | 3.4 | 3.4 | 3.4 | 5.0 |
| Tube | Outer diameter[mm] | 2.0 | 2.0 | 2.0 | 3.5 |
| | Inner diameter[mm] | 1.4 | 1.4 | 0.8 | 2.5 |
| Tension member | Amount[d] | 4500 | 4500 | 400 | 29000 |
| | $S_{Te}/S_{Tu}$[%] | 44 | 44 | 6 | 46 |
| Optical fiber | Type | AGF | HPCF | HPCF | HPCF |
| | NA | 0.29 | 0.37 | 0.29 | 0.29 |
| | Core diameter[μm] | 80 | 200 | 100 | 100 |
| | Cladding diameter[μm] | 125 | 230 | 125 | 125 |
| | Primary coating diameter[μm] | 200 | - | - | - |
| | Secondary coating diameter[μm] | 245 | - | - | - |
| | Ink diameter[μm] | 260 | - | 135 | 135 |
| Ribbon optical fiber | Width[mm] | 1.10 | 1.10 | 0.60 | 0.60 |
| | Thickness[mm] | 0.30 | 0.30 | 0.18 | 0.18 |
| Evaluation results | Impact test | good 0.28dB | good 0.08dB | good 0.48dB | good 0.02dB |
| | Tensile strength test | good 0.05dB | good 0.02dB | fair 0.90dB | good 0.01dB |
| | Bending test | good 0.12dB | good 0.05dB | good 0.11dB | good 0.02dB |
| | Compressive strength test | good 0.11dB | good 0.01dB | good 0.11dB | good 0.01dB |
| | Pinch test | fair | poor | good | good |
| | Initial optical characteristic | good 5dB/km | good 5dB/km | good 7dB/km | good 9dB/km |
| | Cable stiffness | good | good | good | good |

Fig.17

|  |  | Example 35 | Example 36 | Example 37 |
|---|---|---|---|---|
| Cable structure | | 1E | 1F | 1E |
| Sheath | Outer diameter[mm] | 4.2 | 4.2 | 4.2 |
| | Inner diameter[mm] | 3.4 | 3.4 | 3.4 |
| Tube | Outer diameter[mm] | 2.0 | 2.0 | 2.0 |
| | Inner diameter[mm] | 1.0 | 1.0 | 1.0 |
| Tension member | Amount[d] | 4500 | 4500 | 20000 |
| | $S_{Te}/S_{Tu}$[%] | - | - | - |
| Optical fiber | Type | HPCF | HPCF | HPCF |
| | NA | 0.29 | 0.29 | 0.29 |
| | Core diameter[μm] | 80 | 80 | 80 |
| | Cladding diameter[μm] | 125 | 125 | 125 |
| | Primary coating diameter[μm] | - | - | - |
| | Secondary coating diameter[μm] | - | - | - |
| | Ink diameter[μm] | 135 | 135 | 135 |
| Ribbon optical fiber | Width[mm] | 0.60 | 0.60 | 0.60 |
| | Thickness[mm] | 0.18 | 0.18 | 0.18 |
| Evaluation results | Impact test | poor fiber rupture | poor fiber rupture | good 0.32dB |
| | Tensile strength test | good 0.05dB | good 0.05dB | good 0.02dB |
| | Bending test | good 0.12dB | good 0.14dB | good 0.16dB |
| | Compressive strength test | good 0.12dB | good 0.11dB | good 0.10dB |
| | Pinch test | good | good | good |
| | Initial optical characteristic | good 5dB/km | good 5dB/km | good 5dB/km |
| | Cable stiffness | fair | fair | poor |

OPTICAL CABLE

BACKGROUND OF THE INVENTION

1. Field of the Invention

The present invention relates to an optical cable.

2. Related Background Art

Japanese Utility Model Application Laid-Open No. 60-165918 discloses a reinforcement-plastic-coated loose tube cable. This loose tube cable has a structure in which one or a plurality of coated optical fibers are contained in a tube made of a thermoplastic resin. The plurality of coated optical fibers are contained loosely in the tube without coming into close contact therewith.

Japanese Utility Model Application Laid-Open No. 62-46414 discloses an optical fiber unit. This optical fiber unit has a structure in which a plurality of ribbon-shaped coated optical fibers are contained in a space within a cylindrical tube. The plurality of ribbon-shaped coated optical fibers are stacked on top of another and integrated on one side face thereof as being bonded to a tape through an adhesive.

Japanese Patent Application Laid-Open No. 9-80279 discloses a ribbon-shaped optical fiber cable. This ribbon-shaped optical fiber cable has a structure in which a plurality of optical fibers arranged in a row are integrated as being held between two plastic films.

Japanese Patent Application Laid-Open No. 2011-85854 discloses an optical fiber cable incorporating therein a plastic clad fiber (PCF). The plastic clad fiber comprises a plastic clad optical fiber in which the outer periphery of a glass core made of silica glass is surrounded with a cladding layer made of a resin having a refractive index lower than that of the glass core and a coating layer made of a thermoplastic resin formed around the optical fiber.

SUMMARY OF THE INVENTION

In the field of interconnectors (the field in which devices or parts within a device are connected to each other with an optical fiber), it may be sufficient for an optical cable to contain several to 10-odd optical fibers. Such an optical cable has an outer diameter of several mm and is relatively narrow with a thin protective coating (sheath) for the cable.

When a lateral pressure is applied to an intersection between optical fibers in such an optical cable containing a plurality of optical fibers in a relatively thin sheath, transmission loss may increase in each optical fiber. When a lateral pressure is applied to an intersection between optical fiber ribbons contained in a tube, transmission loss may also increase in optical fibers contained in each optical fiber ribbon.

In the optical cable disclosed in Japanese Utility Model Application Laid-Open No. 62-46414, a plurality of optical fiber ribbons are stacked and bonded together, so that optical fibers contained in one optical fiber ribbon do not intersect with optical fibers contained in another optical fiber ribbon. However, an optical cable having a structure in which a plurality of optical fiber ribbons are stacked and bonded together reduces its flexibility and thus is hard to bend at a small radius, which lowers its workability at the time of being laid out. When the optical cable is bent forcibly, optical fiber ribbons therewithin may be bent compulsorily, so as to increase transmission loss in optical fibers contained in the optical fiber ribbons.

In view of the foregoing, the optical cable in accordance with the present invention comprises an optical fiber ribbon having a plurality of optical fibers arranged in parallel and integrated and a sheath surrounding the optical fiber ribbon. In this optical cable, one optical fiber ribbon is arranged twistably within an inner space surrounded by the sheath.

In this optical cable, an optical fiber ribbon is constructed by integrating a plurality of optical fibers in parallel, so that one optical fiber ribbon is twistable within an inner space surrounded by the sheath. This can prevent optical fibers from intersecting with each other and inhibit transmission loss from being increased by lateral pressures. This can also suppress the increase of transmission loss occurring when the optical cable is bent.

The optical cable may further comprise a tension member disposed around the optical fiber ribbon. This can protect the optical fibers by the buffer effect of the tension member against external impact and suppress the increase in transmission loss and breaking of the optical fibers.

The optical cable may further comprise an inner tube disposed on the inside of the sheath. In this optical cable, the tension member is disposed between the inner tube and the sheath, while one optical fiber ribbon is twistably inserted in an inner space of the inner tube. The optical cable may further comprise a conductive wire disposed on the outside of the inner tube. In general, conductive wires incorporated in an optical cable are likely to induce breakage in optical fibers in response to external impact. Arranging the tension member in the optical cable, by contrast, can effectively reduce the breakage of optical fibers even in the optical cable equipped with the conductive wire.

The optical cable may further comprise an electromagnetic shield layer disposed between the tension member and the sheath. Electromagnetic noises in the surroundings of the optical cable, which have no influence on optical signals propagating through the optical fibers, may influence converted electric signals when a photoelectric conversion part exists within a connector at an end part of the optical cable. Such influences can effectively be reduced when the optical cable is equipped with the electromagnetic shield layer as mentioned above. The heat generated in the photoelectric conversion part can also be released efficiently through the electromagnetic shield layer.

The optical cable may further comprise a tube for containing the optical fiber ribbon and the tension member. This optical cable is constructed such that the tension member is arranged along the optical fiber ribbon, while the sheath surrounds the tube. Since the tension member is contained in the tube together with the optical fibers, when the optical cable is bent in this case, the tension member is always located near a flexural line of the optical cable, whereby the optical fibers can become less stiff because the tension member becomes easy to bend.

The area occupied by the tension member in a cross section perpendicular to a central axis of the optical cable may be at least 5% but not more than 80% of the internal area of the tube in the cross section. When the area occupied by the tension member is at least 5% of the internal area of the tube, a sufficient buffer effect can be obtained. When the area occupied by the tension member is not more than 80% of the internal area of the tube, the transmission loss caused by lateral pressures from the tension member to the optical fibers can be suppressed. More preferably, the area occupied by the tension member in the cross section perpendicular to the central axis of the optical cable is at least 10% but not more than 60% of the internal area of the tube in the cross section.

A value obtained by dividing the amount of the tension member by the internal area of the tube in the cross section perpendicular to the central axis of the optical cable may be at least 650 d/mm² but not more than 10400 d/mm². The value may also be at least 1300 d/mm² but not more than 7800 d/mm².

In the optical cable, the amount of the tension member may be at least 500 denier (d) but not more than 30000 d. When the amount of the tension member is at least 500 d, it can effectively exhibit a tensile function when optical fibers are pulled, so as to efficiently inhibit transmission loss from being increased by tensile strains of the optical fibers. When the amount of the tension member is not more than 30000 d, the outer diameter of the optical cable does not become excessively large, whereby an optical cable suitable for the field of interconnections can be provided.

The optical cable may further comprise an electromagnetic shield layer disposed between the sheath and the tube. Electromagnetic noises in the surroundings of the optical cable, which have no influence on optical signals propagating through the optical fibers, may influence converted electric signals when a photoelectric conversion part exists within a connector at an end part of the optical cable. Such influences can effectively be reduced when the optical cable is equipped with the electromagnetic shield layer as mentioned above. The heat generated in the photoelectric conversion part can also be released efficiently through the electromagnetic shield layer.

The optical cable may further comprise one or a plurality of electric wires arranged between the sheath and the tube. In general, electric wires incorporated in an optical cable are likely to induce breakage in optical fibers in response to external impact. Arranging the tension member in the optical cable, by contrast, can effectively reduce the breakage of optical fibers even in the optical cable equipped with the electric wires. In this case, at least one of the one or plurality of electric wires may be a coaxial electronic wire. This can transmit electric signals with low noise over a long distance between communication devices.

In the optical cable, each of the plurality of optical fibers may have a numerical aperture of at least 0.25 but not more than 0.45. When the numerical aperture of the optical fiber is at least 0.25, the bending loss can sufficiently be kept low, and so is the coupling loss with optical transmitters. When the numerical aperture of the optical fiber is not more than 0.45, the coupling loss with optical receivers can sufficiently be kept low.

In the optical cable, each of the plurality of optical fibers may have a core diameter of at least 60 μm but not more than 100 μm. When the core diameter of the optical fiber is at least 60 μm, the coupling loss caused by optical axis misalignment at the time of connecting with optical transmitters can be kept low. When the core diameter of the optical fiber is not more than 100 μm, the coupling loss with optical receivers can be kept low.

In the optical cable, each of the plurality of optical fibers may have a glass part with a diameter smaller than 125 μm.

In the optical cable, each of the plurality of optical fibers may include a core and a cladding surrounding the core, the core and cladding being constituted by glass and a plastic, respectively. The plurality of optical fibers may further include a color layer arranged on an outer periphery of the cladding. This makes it easier to identify an optical fiber to be processed at a terminal of the optical cable, thereby improving the workability.

BRIEF DESCRIPTION OF THE DRAWINGS

FIG. 10 is a chart listing structures and evaluation results of optical cables of examples;

FIG. 11 is a chart listing structures and evaluation results of optical cables of examples;

FIG. 12 is a chart listing structures and evaluation results of optical cables of comparative examples;

FIG. 14 is a chart listing detailed structures of optical cables used in examples and evaluation results concerning their impact tests, tensile strength tests, bending tests, compressive strength tests, pinch tests, initial optical characteristics, and optical cable stiffness;

FIG. 15 is a chart listing detailed structures of optical cables used in examples and evaluation results concerning their impact tests, tensile strength tests, bending tests, compressive strength tests, pinch tests, initial optical characteristics, and optical cable stiffness;

FIG. 16 is a chart listing detailed structures of optical cables used in examples and evaluation results concerning their impact tests, tensile strength tests, bending tests, compressive strength tests, pinch tests, initial optical characteristics, and optical cable stiffness; and FIG. 17 is a chart listing detailed structures of optical cables used in comparative examples and their evaluation results.

DESCRIPTION OF THE PREFERRED EMBODIMENTS

In the following, modes for carrying out the present invention will be explained in detail with reference to the drawings. In the explanation of the drawings, the same constituents will be referred to with the same signs while omitting their overlapping descriptions.

Figure 1:
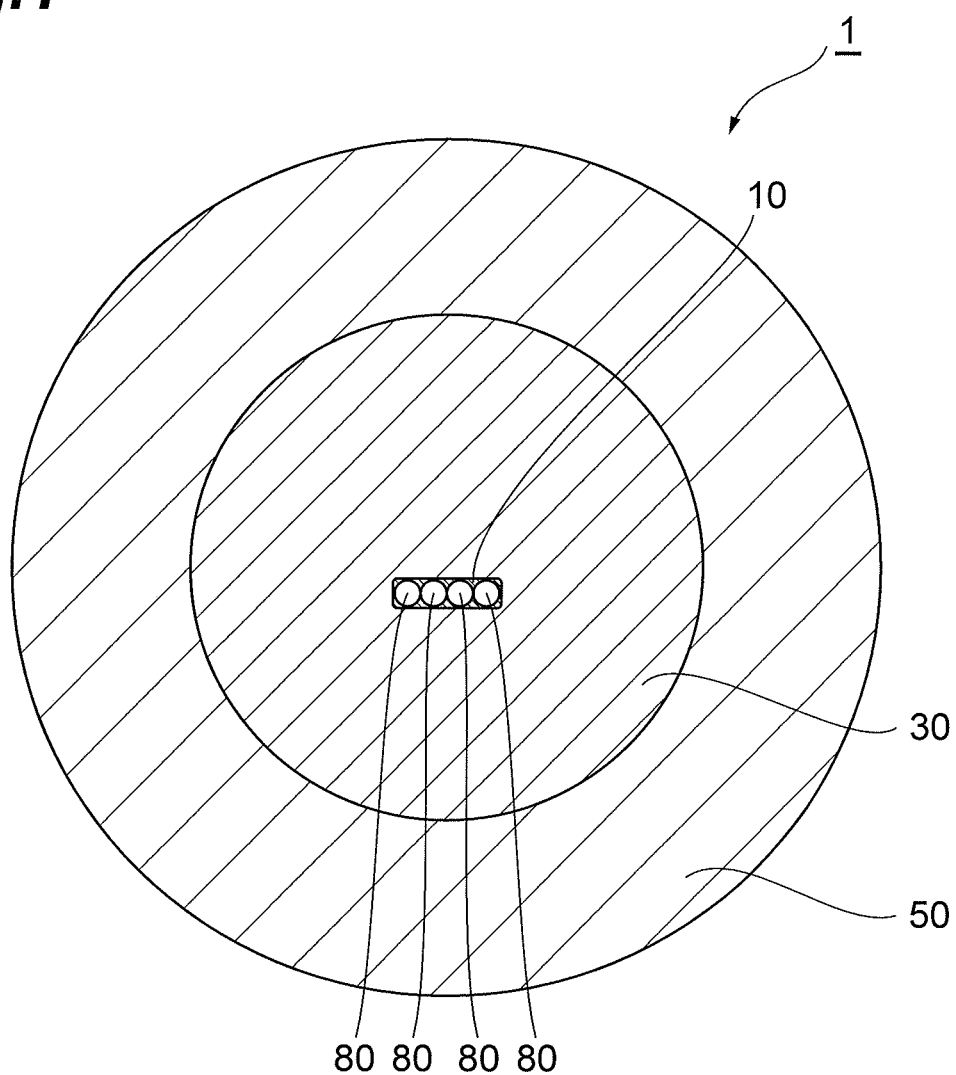
FIG. 1 is a sectional view illustrating the structure of an optical cable in accordance with a first embodiment.

First Embodiment:

FIG. 1 is a sectional view of an optical cable 1 in accordance with the first embodiment. FIG. 1 illustrates a cross section perpendicular to the central axis of the optical cable 1. The optical cable 1 comprises an optical fiber ribbon 10, a tension member 30, and a sheath 50.

The optical fiber ribbon 10 is constructed by integrating a plurality of optical fibers 80 arranged in parallel. In general, the plurality of optical fibers 80 are an even number of optical fibers. The sheath 50 is provided so as to surround the optical fiber ribbon 10. The sheath 50 is used for protecting the optical cable 1 and constituted by a polyolefin, examples of which include PVC, PE, and EVA. One optical fiber ribbon 10 is twistably arranged within an inner space surrounded by the sheath 50.

The tension member 30 may be disposed about the optical fiber ribbon 10. The tension member 30, which is preferably fibrous, is preferably made of an aramid fiber (Kevlar (registered trademark)). The optical fiber ribbon 10 is twistable even when surrounded by the tension member 30.

Thus constructed optical cable 1 is equipped with only one optical fiber ribbon 10, so that optical fiber ribbons do not intersect with each other, and the plurality of optical fibers contained in the one optical fiber ribbon 10 do not intersect with each other, whereby transmission loss can be inhibited from increasing in response to lateral pressures. The optical cable 1 can be bent easily when the bending direction is the thickness direction of the optical fiber ribbon 10. The optical cable 1 can also bend easily when bent in the width direction of the optical fiber ribbon 10 (the direction in which a plurality of optical fibers are arranged), since the optical fiber ribbon 10 can twist so as to turn the bending direction into the thickness direction thereof. The optical cable 1 is thus restrained from reducing its flexibility, and the optical fiber ribbon 10 is not unnaturally bent when bending the optical cable 1, whereby transmission loss can be inhibited from increasing.

FIGS. 2 to 5 are diagrams illustrating respective examples of a cross-sectional structure of the optical fiber ribbon 10. Each of optical fiber ribbons 10A to 10D illustrated in these diagrams can be used as the optical fiber ribbon 10 in each of the optical cable 1 in accordance with this embodiment and optical cables 2 to 7 which will be explained later. Though each of the optical fiber ribbons 10A to 10D has four fibers in the following explanation, they are not restrictive.

Figure 2:
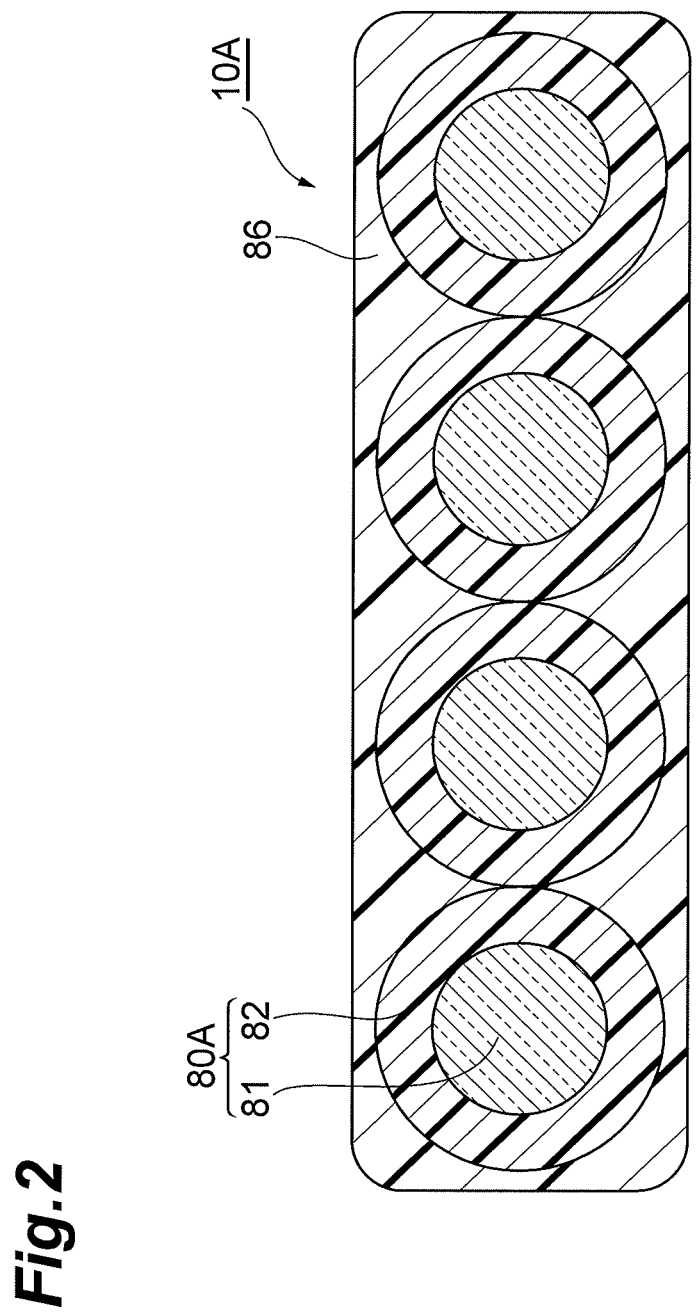
FIG. 2 is a diagram illustrating an example of cross-sectional structures of an optical fiber ribbon.

The optical fiber ribbon 10A illustrated in FIG. 2 has four optical fibers 80A arranged in parallel and integrated with a coating 86. Each optical fiber 80A has a core 81 and a cladding 82 surrounding the core 81. For example, the core 81 and cladding 82 have diameters of 80 μm and 125 μm, respectively. The cladding is formed from a UV-curable resin containing fluorine, for example.

Figure 3:
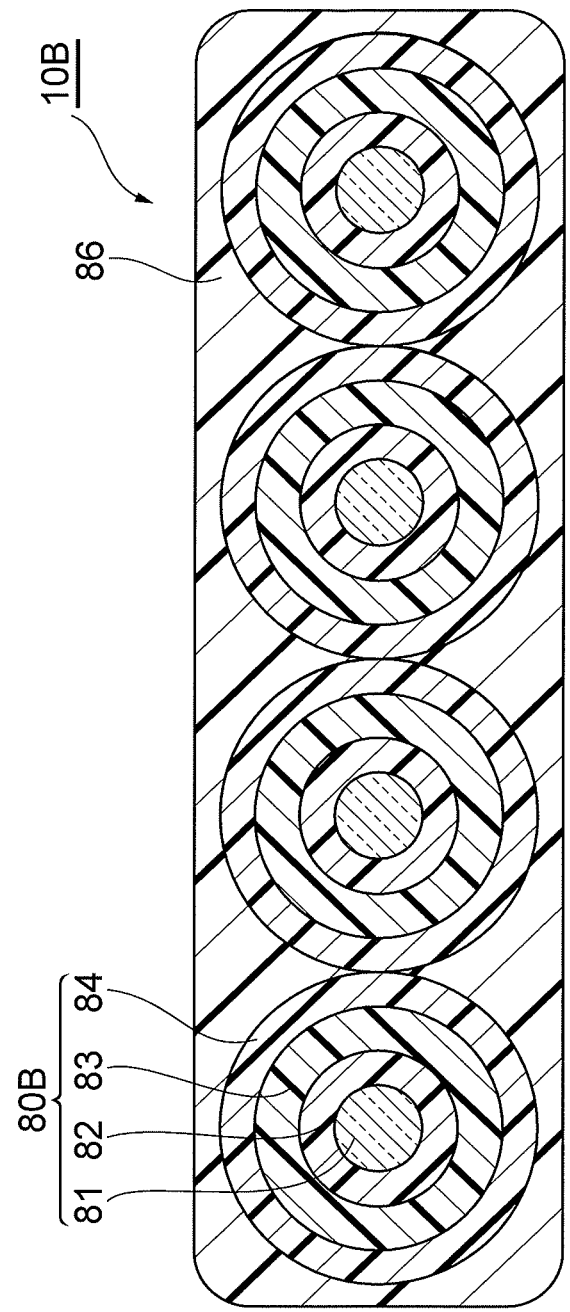
FIG. 3 is a diagram illustrating an example of cross-sectional structures of the optical fiber ribbon.

The optical fiber ribbon 10B illustrated in FIG. 3 has four optical fibers 80B arranged in parallel and integrated with the coating 86. Each optical fiber 80A has a core 81, a cladding 82 surrounding the core 81, a primary coating layer 83 surrounding the cladding 82, and a secondary coating layer 84 surrounding the primary coating layer 83. For example, the core 81, cladding 82, primary coating layer 83, and secondary coating layer 84 have outer diameters of 80 μm, 125 μm, 200 μm, and 245 μm, respectively.

The primary and secondary coating layers 83, 84 can be formed from materials similar to those used for typical coated optical fibers. For example, the coating layers 83, 84 can be formed from UV-curable resins based on urethane (meth) acrylate. Relatively soft and hard resins having relatively lower and higher Young's moduli (several MPa and several hundred to one thousand and several hundred MPa) are used for the primary and secondary coating layers 83, 84, respectively. The optical fiber ribbon 10B illustrated in FIG. 3 is superior to that illustrated in FIG. 2 in terms of the lateral pressure characteristic, since it has the primary and secondary coating layers 83, 84.

Figure 4:
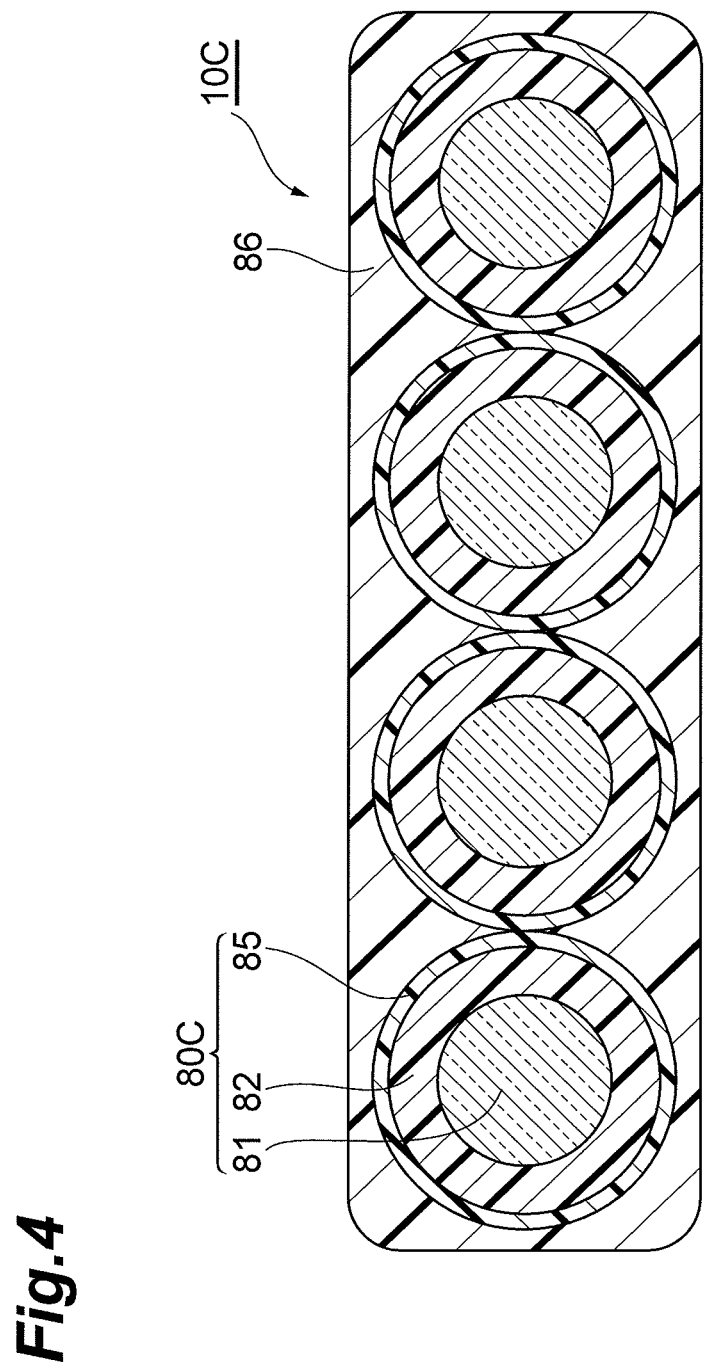
FIG. 4 is a diagram illustrating an example of cross-sectional structures of the optical fiber ribbon.

The optical fiber ribbon 10C illustrated in FIG. 4 has four optical fibers 80C arranged in parallel and integrated with a coating 86. Each optical fiber 80C has a core 81, a cladding 82 surrounding the core 81, and a color layer 85 surrounding the cladding 82. For example, the core 81, cladding 82, and color layer 85 have outer diameters of 80 μm, 115 μm, and 125 μm, respectively. The color layer 85 can be formed by a UV-curable resin colored with a pigment or the like added thereto, for example. The coated optical fibers tinted with different colors can be identified by their colors.

Figure 5:
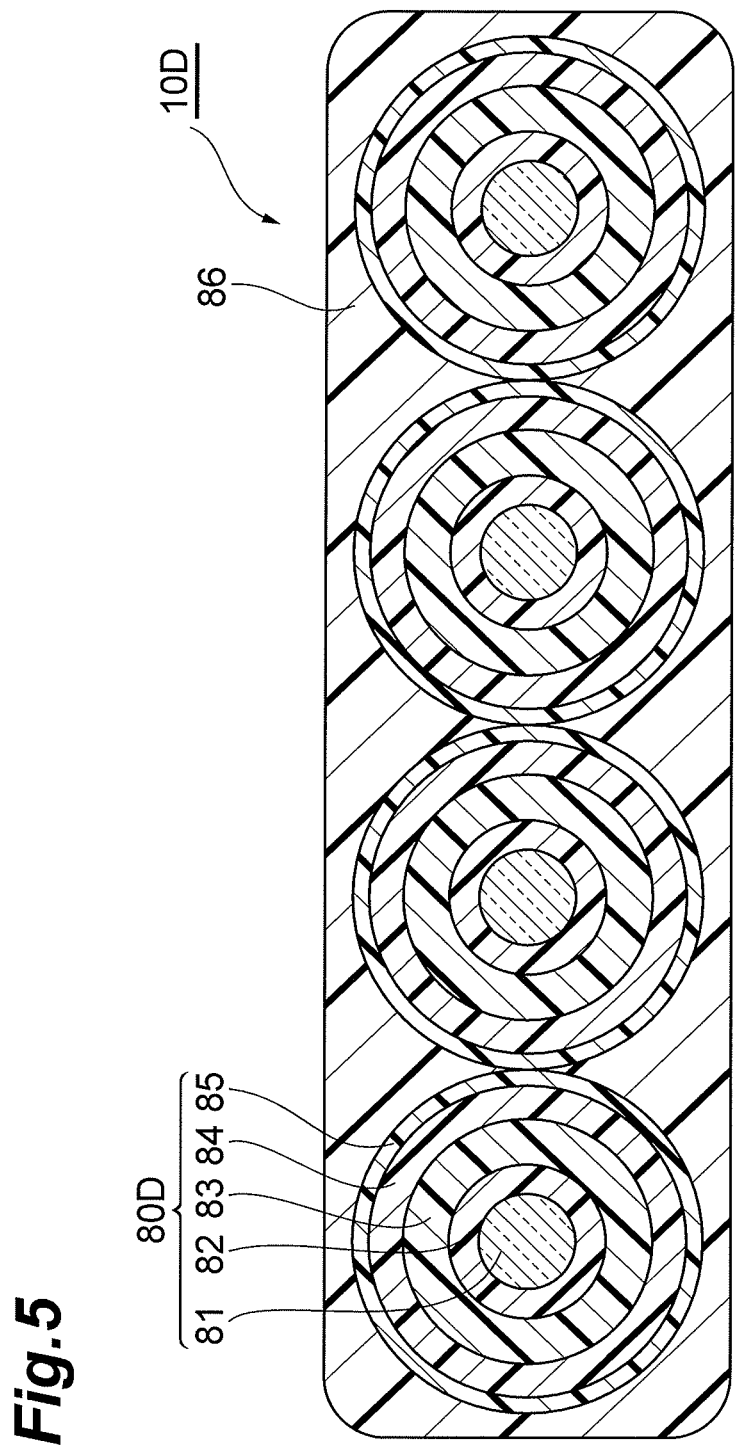
FIG. 5 is a diagram illustrating an example of cross-sectional structures of the optical fiber ribbon.

The optical fiber ribbon 10D illustrated in FIG. 5 has four optical fibers 80D arranged in parallel and integrated with a coating 86. Each optical fiber 80D has a core 81, a cladding 82 surrounding the core 81, a primary coating layer 83 surrounding the cladding 82, a secondary coating layer 84 surrounding the primary coating layer 83, and a color layer 85 surrounding the secondary coating layer 84. For example, the core 81, cladding 82, primary coating layer 83, secondary coating layer 84, and color layer 85 have outer diameters of 80 μm, 125 μm, 200 μm, 245 μm, and 250 μm, respectively. The structures and functions of the primary coating layer 83, secondary coating layer 84, and color layer 85 are the same as those mentioned above.

In each of the optical fibers 80A to 80D, the core 81 has a refractive index higher than that of the cladding 82 and can guide light. The core 81 is made of glass. The cladding 82 may be either glass or a plastic in the optical fibers 80B to 80D (but is limited to a plastic in the structure of the optical fiber 80A). An optical fiber in which both of the core 81 and cladding 82 are made of glass is referred to as AGF (All Glass Fiber). An optical fiber whose core 81 and cladding 82 are made of glass and a plastic, respectively, is referred to as HPCF (Hard Plastic Clad Silica Fiber). The primary coating layer 83, secondary coating layer 84, color layer 85, and coating 86 are made of resins. The primary and secondary coating layer 83, 84 are made of resins having lower and higher Young's moduli, respectively.

Each of the optical fibers 80A to 80D preferably has a numerical aperture (NA) of at least 0.25 but not more than 0.45. The optical fiber whose numerical aperture is at least 0.25 does not increase its bending loss much even when bent at a small radius of 5 mm. Increasing the refractive index difference between the core and cladding can enhance the numerical aperture, thereby effectively restraining the transmission loss from increasing when the optical fiber is bent at a small radius. However, while the amount of impurities added for adjusting refractive index and the amount of adjustment of refractive index have a positive correlation therebetween, there is an upper limit for the amount of addition, which limits the refractive index difference between the core and cladding. Hence, the upper limit of the numerical aperture is 0.45.

Preferably, in each of the optical fibers 80A to 80D, the core diameter is 60 to 100 μm. As the core diameter becomes smaller, the transmission loss is increased more by optical axis misalignment when connecting with connectors, whereby the core diameter is preferably at least 60 μm. When the cladding diameter is 125 μm as with typical optical fibers, the optical fiber can be connected to typical connectors. When the cladding diameter is 125 μm, the core diameter is preferably 100 μm or less in view of the required diametrical thickness of the cladding.

Preferably, in each of the optical fibers 80A to 80D, the glass part has a diameter smaller than 125 μm. As the glass part of the optical fiber has a larger diameter, the optical fiber is more likely to rupture. The optical fiber is hard to rupture when the glass part has a diameter smaller than 125 μm. An HPCF having a cladding diameter of 125 μm is superior to an AGF having the same cladding diameter in terms of resistance to rupture. When bending an optical cable having a diameter of 4.2 mm at a radius of curvature of 2 mm, it may break within one month if a coated optical fiber contained therein is an AGF having a cladding diameter of 125 μm, but is highly likely to be kept from breaking for one month or more if it is an HPCF having a glass core diameter of 80 μm.

The optical fiber in accordance with the present invention is preferably an HPCF in this regard, but is not limited thereto.

The HPCF is likely to increase its transmission loss in response to lateral pressures, since the plastic constituting the cladding has a lower Young's modulus. Preferably, for improving the resistance to lateral pressures, an optical fiber ribbon comprises a plurality of HPCFs arranged in parallel. Therefore, an optical cable equipped with an optical fiber ribbon in which a plurality of HPCFs are arranged in parallel is preferred because of its favorable resistance to lateral pressures and excellent resistance to rupture.

Figure 6:
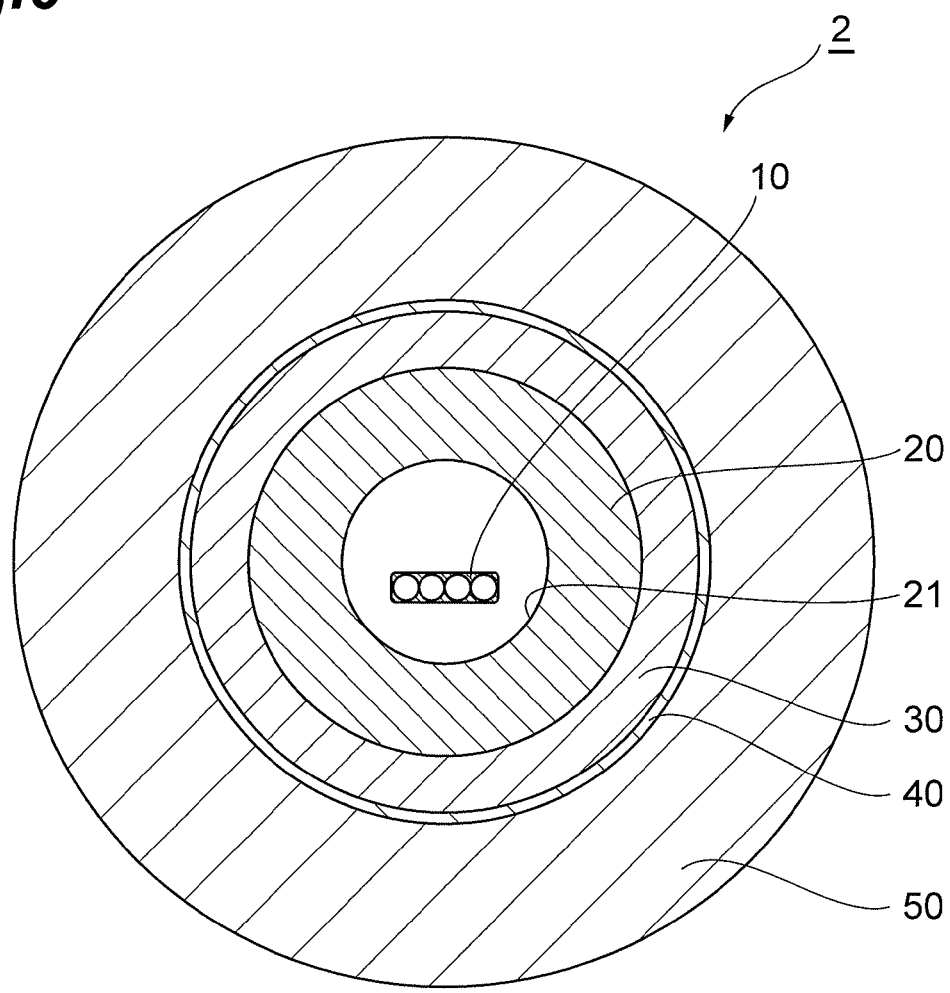
FIG. 6 is a sectional view illustrating the structure of the optical cable in accordance with a second embodiment.

Second Embodiment:

FIG. 6 is a sectional view of an optical cable 2 in accordance with the second embodiment. FIG. 6 illustrates a cross section perpendicular to the central axis of the optical cable 2. The optical cable 2 comprises a optical fiber ribbon 10, an inner tube 20, a tension member 30, an electromagnetic shield layer 40, and an sheath 50.

The optical fiber ribbon 10 is inserted in an inner space 21 of the inner tube 20 and twistable in the inner space 21. One optical fiber ribbon 10 is inserted in the inner space 21 of the inner tube 20, which is constituted by polyvinyl chloride (PVC), for example. The inner space 21 of the inner tube 20 has such a size that the optical fiber ribbon 10 is twistable therein. Preferably, the diameter of the inner space 21 of the inner tube 20 is greater than the width (in the direction in which the plurality of optical fibers are arranged) of the optical fiber ribbon 10 by at least 0.2 mm. The inner tube 20 having a thickness of 0.3 to 1 mm, for example, is usable.

The tension member 30 is disposed on the outside of the inner tube 20. The tension member 30, which is preferably fibrous, is preferably made of an aramid fiber. Preferably, the electromagnetic shield layer 40 is disposed on the outside of the tension member 30. The electromagnetic shield layer 40 is constructed by a braid of metal wires. The sheath 50 is disposed on the outside of the electromagnetic shield layer 40.

The optical cable propagates an optical signal, on which no electromagnetic noises are superposed. When an O/E conversion part exists within a connector at an end part of the optical cable, the optical signal is converted into an electric signal by the connector, which makes it preferable for the electromagnetic shield layer 40 to be disposed near the end part where the optical cable 2 is attached to the connector. When provided on the outside of the tension member 30 but inside of the sheath 50, the electromagnetic shield layer 40 is hard to be placed only near the end part of the optical cable 2, whereby the electromagnetic shield layer 40 can be manufactured more easily when disposed within the sheath 50 over the whole length of the optical cable 2.

Since thus constructed optical cable 2 is equipped with only one optical fiber ribbon 10, optical fiber ribbons do not intersect with each other, and the plurality of optical fibers contained in the one optical fiber ribbon 10 do not intersect with each other, whereby transmission loss can be inhibited from increasing in response to lateral pressures. The optical cable 2 can be bent easily in the thickness direction of the optical fiber ribbon 10. The optical cable 2 can also bend easily when bent in the width direction of the optical fiber ribbon 10 (the direction in which a plurality of optical fibers are arranged), since the optical fiber ribbon 10 can twist within the inner space 21 of the inner tube 20 so as to turn the bending direction into the thickness direction thereof. The optical cable 2 is thus restrained from reducing its flexibility, and the optical fiber ribbon 10 is not unnaturally bent when bending the optical cable 2, whereby transmission loss can be inhibited from increasing.

The inner tube 20 that secures a required space around the optical fiber ribbon 10 is needed to be soft to such an extent that the optical cable 2 having a diameter of 4.2 mm can be bent at a radius of curvature of 2 mm, which makes it preferable for the inner tube 20 to be constituted by PVC, a fluororesin, or the like having a modulus of elasticity of 50 to 1000 MPa.

Figure 7:
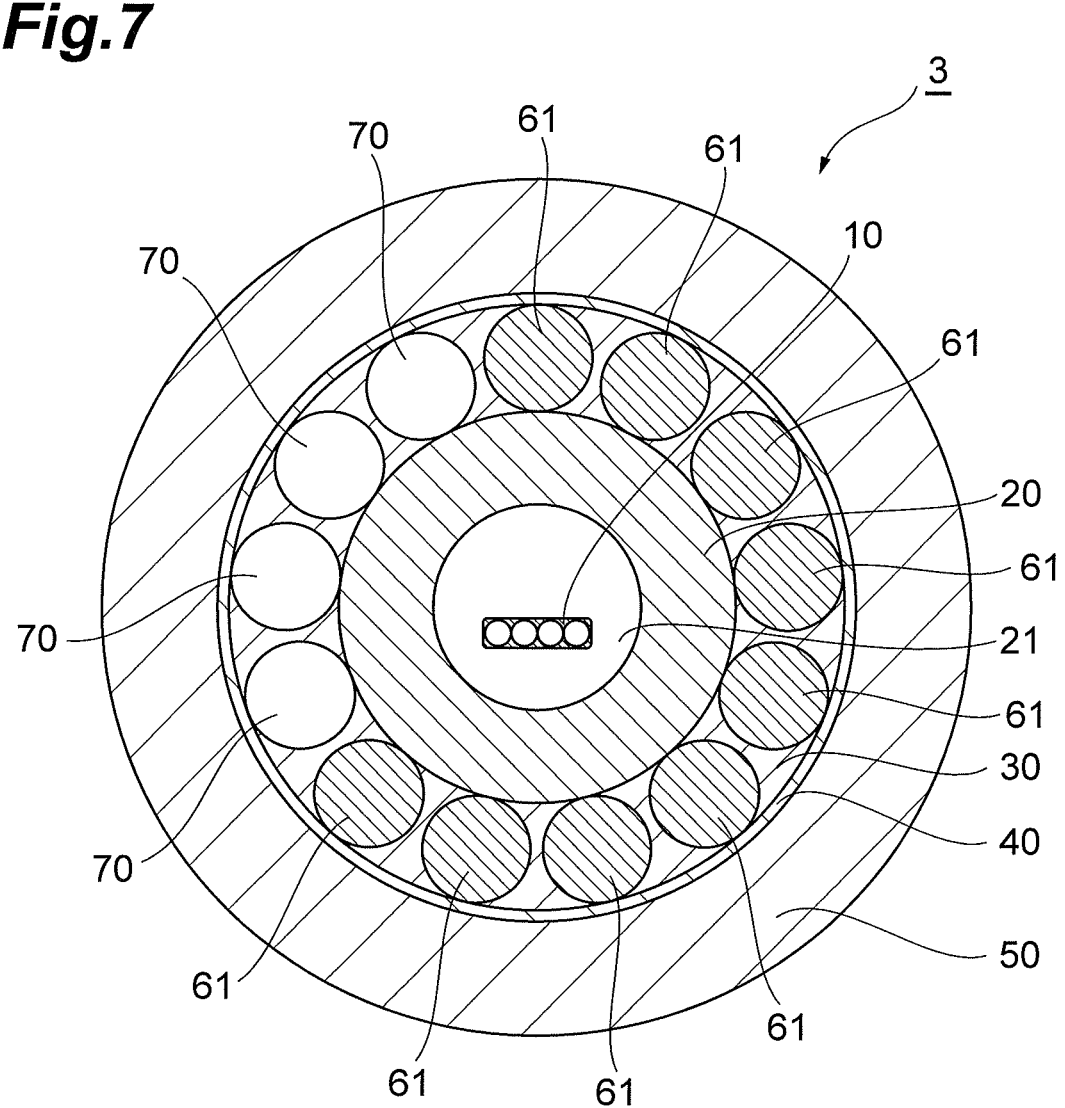
FIG. 7 is a sectional view illustrating the structure of the optical cable in accordance with a third embodiment.

Third Embodiment:

FIG. 7 is a sectional view of an optical cable 3 in accordance with the third embodiment. FIG. 7 illustrates a cross section perpendicular to the central axis of the optical cable 3. The optical cable 3 comprises an optical fiber ribbon 10, an inner tube 20, a tension member 30, an electromagnetic shield layer 40, and a sheath 50 and, in addition, wires 61 and fillers 70. The third embodiment differs from the second embodiment in that the wires 61 and fillers 70 having the same outer diameter are disposed on the outside of the inner tube 20 but inside of the electromagnetic shield layer 40. While nine wires 61 and four fillers 70 are provided in FIG. 7, their numbers are arbitrary. All of those arranged on the outside of the inner tube 20 may be constituted by wires and no fillers. Two wires may form a pair. Each of the wires 61, which is a metal wire surrounded with an insulating coating or a coaxial electronic wire, can propagate electric signals. The tension member 30 is disposed between the inner tube 20 and electromagnetic shield layer 40 so as to fill gaps between the wires 61 and fillers 70.

As illustrated in FIG. 7, when the inner tube 20 is provided, the wires 61 adapted to propagate electric signals may be arranged on the outside of the inner tube 20. If the inner tube 20 is not provided, the wires 61 may be pressed against the optical fiber ribbon 10, whereby the increase in transmission loss caused by lateral pressures may become greater. Therefore, the wires 61 are arranged on the outside of the inner tube 20.

Figure 8:
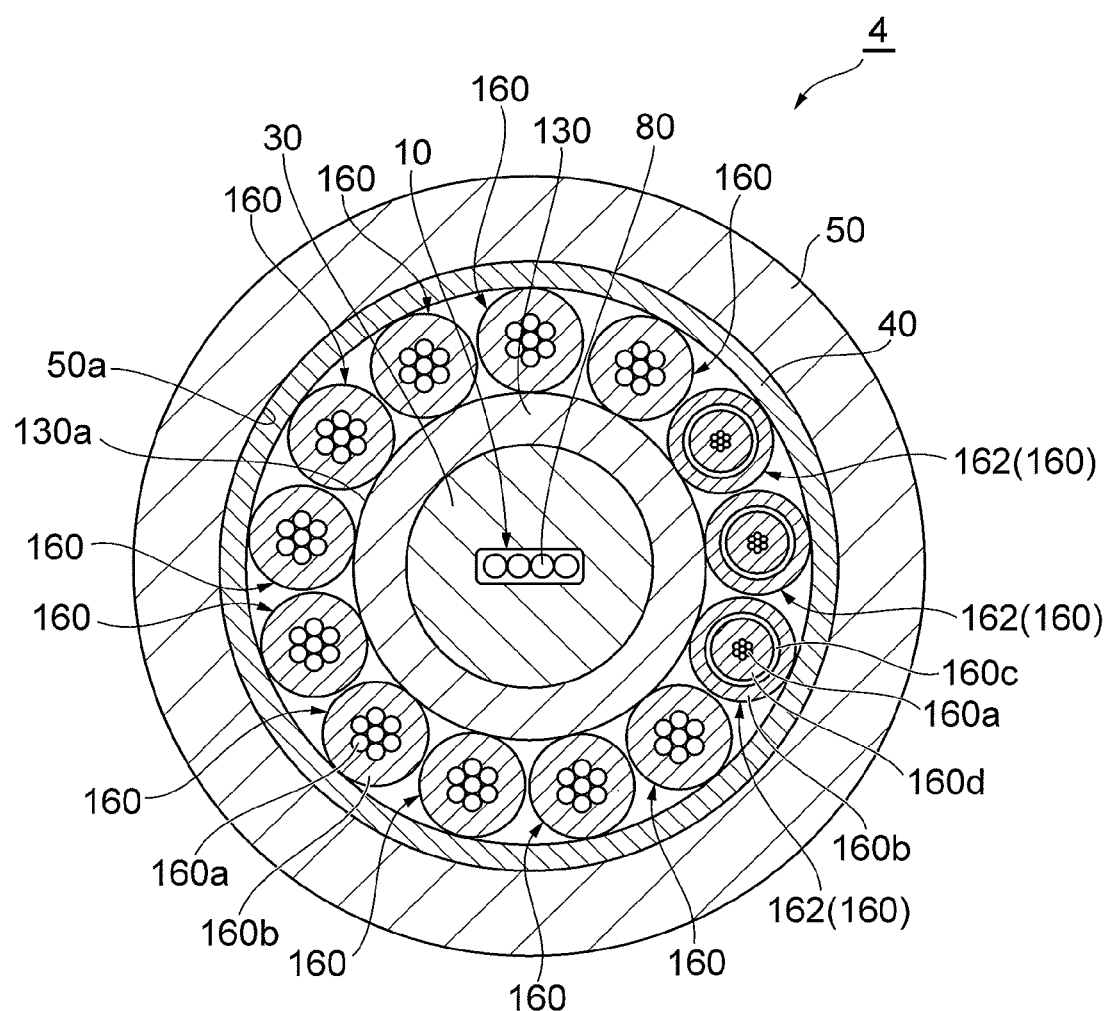
FIG. 8 is a sectional view illustrating the structure of the optical cable in accordance with a fourth embodiment.

Fourth Embodiment:

FIG. 8 is a sectional view of an optical cable 4 in accordance with the fourth embodiment. FIG. 8 illustrates a cross section perpendicular to the central axis of the optical cable 4. As illustrated in FIG. 8, the optical cable 4 comprises an optical fiber ribbon 10, a tension member 30, a cylindrical tube 130 containing the optical fiber ribbon 10 and tension member 30, a sheath 50 covering the tube 130, and electric wires 160.

The optical fiber ribbon 10 is arranged within the inner space of the tube 130 and preferably floatable there. Preferably, the optical fiber ribbon 10 is arranged on or near the central axis of the optical cable 4. The tube 130 contains the central axis of the optical cable 4 within its inner space. In this embodiment, one optical fiber ribbon 10 is arranged within the inner space of the tube 130. For thinning the optical cable 4, the outer diameter of the tube 130 is preferably 4.0 mm or less, for example. The tube 130 preferably has a thickness of 0.3 mm or greater, for example, in order to prevent it from breaking under external impact.

The tube 130 is manufactured by an extruder, for example. Preferred examples of materials for the tube 130 include halogen-containing resins such as PVC and vinylidene chloride; polyolefin resins such as polyethylene (PE), polypropylene (PP), and ethylene-vinyl acetate (EVA) copolymer resins; and fluororesins such as ETFE and PFA. Further examples of materials employable for the tube 130 include polyester, urethane, nylon, polyacetal, and polyolefin oxide resins. Materials having a Young's modulus equivalent to or higher than that of the sheath 50 are used for the tube 130. From the viewpoints of improving the impact resistance and compressive strength characteristic of the optical fiber ribbon 10 within the tube 130, the tube 130 preferably has a Young's modulus higher than that of the sheath 50. The Young's modulus of the tube 130 may be 10 MPa to 100 MPa, for example.

Reference will now be made to FIG. 8 again. The tension member 30 has a longitudinal direction along the central axis of the optical cable 4 and is arranged along the optical fiber ribbon 10 between the inner face of the tube 130 and the optical fiber ribbon 10. The tensile member 30, which is preferably fibrous, is preferably made of an aramid fiber (e.g., Kevlar (registered trademark) manufactured by Du Pont-Toray Co., Ltd. or Technora (registered trademark) manufactured by Teijin Ltd.), for example.

The tension member 30 is thus contained in the tube 130 together with the optical fiber ribbon 10 in the optical cable 4. This can protect the optical fiber ribbon 10 through the buffer effect of the tension member 30 against external impact, thereby suppressing the increase in transmission loss and breakage of the optical fibers 80. Since the tension member 30 is contained in the tube 130 together with the optical fiber ribbon 10, when the optical cable 4 is bent, the tension member 30 is always located near a center line of the bent optical cable 4, whereby the optical cable 4 can become less stiff because the tension member 30 becomes easy to bend. Thus, the optical cable 4 in accordance with this embodiment can suppress the increase in transmission loss and breakage of the optical fibers 80 in response to external impact and the stiffness in the optical cable 4.

As evidenced by examples which will be explained later, the area occupied by the tension member 30 in a cross section perpendicular to the central axis of the optical cable 4 is preferably at least 5% but not more than 80% of the internal area of the tube 130 in this cross section. When the area occupied by the tension member 30 is at least 5% of the internal area of the tube 130, a sufficient buffer effect can be obtained, by which the increase in transmission loss and breakage of the optical fibers 80 can be suppressed more effectively. When the area occupied by the tension member 30 is not more than 80% of the internal area of the tube 130, the optical fiber ribbon is twistable, so that the transmission loss (initial transmission loss in particular) caused by lateral pressures from the tension member 30 to the optical fiber ribbon 10 can be suppressed. As evidenced by examples which will be explained later, the area occupied by the tension member 30 in the cross section is more preferably at least 10% but not more than 60% of the internal area of the tube 130 in the cross section.

As evidenced by examples which will be explained later, the amount of the tension member 30 is preferably at least 500 d but not more than 30000 d. When the amount of the tension member 30 is at least 500 d, it can effectively exhibit a tensile function when the optical cable 4 is pulled, so as to efficiently inhibit transmission loss from being increased by tensile strains of the optical fibers 80. When the amount of the tension member 30 is not more than 30000 d, the outer diameter of the optical cable 4 does not become excessively large, whereby an optical cable suitable for the field of interconnections can be provided. Here, 1 d (denier) represents the thickness of a yarn which weighs 1 g per 9000 m.

When the ratio of the area occupied by the tension member 30 in the internal area of the tube 130 is expressed by the value obtained by dividing the amount of the tension member 30 (in the unit of denier) put into the tube 130 by the internal area of the tube 130 (in the unit of $mm^2$), the above-mentioned area ratio of 5% corresponds to 650 $d/mm^2$. The above-mentioned area ratio of at least 5% but not more than 80% is expressed as at least 650 $d/mm^2$ but not more than 10400 $d/mm^2$. The above-mentioned area ratio of at least 10% but not more than 60% is expressed as at least 1300 $d/mm^2$ but not more than 7800 $d/mm^2$.

The sheath 50 is provided for protecting the optical cable 4 as a whole and has a substantially cylindrical form. The sheath 50 covers the electric wires 160 as well as the tube 130. For example, the sheath 50 preferably has an outer diameter of 8.0 mm or less in the field of interconnections where it is desirable for the wiring about devices to save space. The sheath 50 has a thickness of at least 0.3 mm, for example, in order to prevent it from breaking under external impact.

The sheath 50 is manufactured by an extruder, for example, as with the tube 130. The sheath 50 is made of the same material as with the tube 130, preferred examples of which include halogen-containing resins such as PVC and vinylidene chloride; polyolefin resins such as PE, PP, and EVA; and fluororesins such as ETFE and PFA. Further examples of materials employable for the sheath 50 include polyester, urethane, nylon, polyacetal, and polyolefin oxide resins. The Young's modulus of the sheath 50 may be 1 MPa to 20 MPa, for example. The same holds for the sheaths 50 in the other embodiments.

A plurality of electric wires 160 are arranged side by side about the central axis of the optical cable 4 between the outer face 130a of the tube 130 and the inner face 50a of the sheath 50. Each electric wire 160 is in contact with both of the outer face 130a and inner face 50a, while the neighboring electric wires 160 are in contact with each other. The plurality of electric wires 160 include coaxial wires 162. Each electric line 160 includes a plurality of metal wires 160a and an insulating coating material 160b covering the wires 160a. Each coaxial wires 162 further has an outer conductor 160c for a shield surrounding the wires 160a and an insulating conductor 160d arranged between the wires 160a and the outer conductor 160c. The coaxial wires 162 are provided in order to transmit electric signals which are sent and received between electronic devices mutually connected by the optical cable 4.

In general, wires incorporated in an optical cable are likely to induce breakage in optical fibers in response to external impact. By contrast, the optical cable 4 in accordance with this embodiment in which the tension member 30 is arranged within the tube 130 together with the optical fiber ribbon 10 can effectively reduce breakage in the optical cable 4 equipped with the electric wires 160. When the plurality of electric wires 160 are partly constituted by the coaxial wires 162 as in this embodiment, electric signals can be transmitted with low noise over a long distance between communication devices.

The electric wires 160 may partly be replaced with plastic fillers. The plastic fillers are made of string-shaped high-density polyethylene (HDPE), for example. A string of HDPE having an outer diameter substantially equal to that of the electric wire 160 may be arranged between the outer face 130a of the tube 130 and the inner face 50a of the sheath 50. A yarn of polypropylene or the like may also be arranged between the tube 130 and the sheath 50. By uniformly covering the outer periphery of the tube 130 with the electric wires 160 and the plastic fillers, a favorable appearance of the cable 4 can be obtained.

Preferably, the plurality of electric wires 160 are arranged evenly about the central axis of the optical cable 4 while being stranded thereabout. When the plastic fillers are provided as mentioned above, a plurality of electric wires 160 and plastic fillers are preferably arranged evenly about the central axis of the optical cable 4 while being stranded thereabout. Thus evenly arranging a plurality of electric wires 160 (and plastic fillers) can reduce irregularities occurring on the surface of the optical cable 4 and keep a favorable appearance thereof.

Referring to FIG. 8, the optical cable 4 further comprises an electromagnetic shield layer 40. The electromagnetic shield layer 40 is disposed between the tube 130 and the sheath 50, more preferably between the electric wires 160 and the sheath 50. The electromagnetic shield layer 40 is favorably constructed by a spiral winding of a tape-like metal, a spiral winding or braid of metal lines, or the like.

Electromagnetic noises in the surroundings of the optical cable 4, which have no influence on optical signals propagating through the optical fibers 80, may influence converted electric signals when a photoelectric conversion part exists within a connector at an end part of the optical cable 4. Such influences can effectively be reduced when the optical cable 4 is equipped with the electromagnetic shield layer 40 as in this embodiment. The heat generated in the photoelectric conversion part can also be released efficiently through the electromagnetic shield layer 40. This can further inhibit electromagnetic noises from influencing signals and electric power propagating through a plurality of electric wires 160. Low-speed signals, which are likely to be influenced by electromagnetic noises in particular, can effectively be shielded by the electromagnetic shield layer 40 even when the plurality of electric wires 160 include those for low-speed signal communications.

Figure 9:
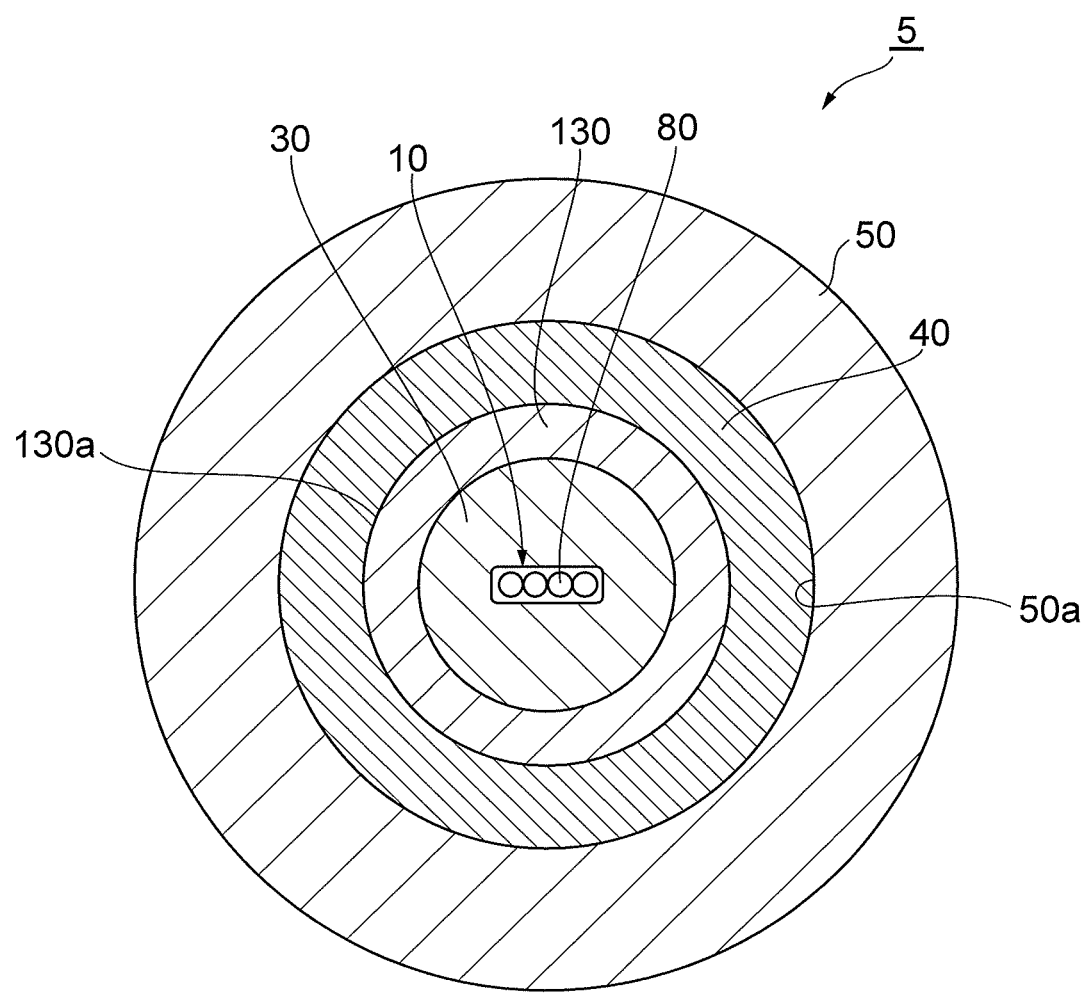
FIG. 9 is a sectional view illustrating the structure of the optical cable in accordance with a fifth embodiment.

Fifth Embodiment:

FIG. 9 is a sectional view of an optical cable 5 in accordance with the fifth embodiment. FIG. 9 illustrates a cross section perpendicular to the central axis of the optical cable 5. As illustrated in FIG. 9, the optical cable 5 lacks the electric wires 160 and plastic fillers depicted in the fourth embodiment. It also lacks the space between the electric shield layer 40 and the tube 130.

The above-mentioned effects of embodiments can also be exhibited even when the optical cable lacks the electric wires and plastic fillers as in this embodiment.

EXAMPLES

Examples using the optical cables 1 to 3 of the above-mentioned embodiments 1 to 3 and an optical cable using four optical fibers in place of the optical fiber ribbon as comparative examples will now be explained. FIGS. 10 to 12 are charts listing structures and evaluation results of the respective optical cables in accordance with examples and comparative examples. FIG. 10 illustrates Examples 1 to 9, FIG. 11 Examples 10 to 17, and FIG. 12 Comparative Examples 1 to 6.

Each chart lists the type of optical fiber, NA of the optical fiber, core diameter of the optical fiber, cladding diameter of the optical fiber, diameter of the primary coating layer of the optical fiber, diameter of the secondary coating layer of the optical fiber, and size of the optical fiber ribbon (four cores) for each of its corresponding examples or comparative examples. In the column of optical fiber type, "HPCF" is an optical fiber whose core and cladding are made of glass and a plastic, respectively, while "AGF" is an optical fiber in which both of the core and cladding are made of glass. Each of Comparative Examples 1 to 5 used four optical fibers in place of the optical fiber ribbon.

Each chart also lists the cable structure of the optical cable, the inner diameter, outer diameter, material, and modulus of elasticity of the inner tube, the inner and outer diameters of the sheath, and the amount of tension member (aramid fiber). In the column of cable structure, "Type A" and "Type B" indicate structures illustrated in FIGS. 1 and 6, respectively.

Each chart further lists evaluation results of lateral pressure, rupture resistance, and bending characteristic. For evaluating the lateral pressure characteristic, the increase in transmission loss occurring when a load of 350 N was applied laterally to the optical cable by using a cylindrical mandrel having a diameter of 60 mm was measured. The lateral pressure characteristic was graded pass when the increase in transmission loss was less than 2.0 dB. For evaluating the rupture resistance characteristic, the time required for the optical fiber to rupture when the optical cable was bent by 180 degrees at one location was measured, and each chart assigns "good," "fair," and "poor" to respective cases where it took at least one month, at least one week but less than one month, and less than one week to rupture. The rupture resistance characteristic was graded pass when it took at least one week to rupture. For evaluating the bending characteristic, the increase in transmission loss occurring when the optical cable was wound by 10 turns at a radius of 5 mm was measured, and the bending characteristic was graded pass when the increase in transmission loss was less than 2.0 dB.

The following were seen from these charts. The lateral pressure characteristic was unfavorable in each of the optical fibers of Comparative Examples 1 to 5 using four optical fibers in place of the optical fiber ribbon. By contrast, the lateral pressure characteristic was favorable in each of the optical fibers of Examples 1 to 17 constructed such that one optical fiber ribbon was twistably arranged.

Each of Comparative Examples 1 to 5 is assumed to have an unfavorable lateral pressure characteristic because of a lateral pressure applied to a part where the four optical fibers intersect. An optical cable containing a plurality of optical fiber ribbons is similarly assumed to exhibit a poor lateral pressure characteristic when a lateral pressure is applied to an intersection between optical fiber ribbons.

Comparative Example 6 in which the inner diameter of the inner tube differs from the width of the optical fiber ribbon by only 0.05 mm is assumed to yield an unfavorable bending characteristic since the optical fiber ribbon fails to twist well and incurs an unnatural force in the inner tube. This is an example in which the optical fiber ribbon is not twistable in the inner tube.

The following can be set forth when the evaluation results of the optical cables in accordance with Examples 1 to 17 are compared. In the case where the NA of the optical fiber is at least 0.25, the increase in transmission loss is small even when the optical cable is bent at a small radius (radius of 5 mm). The optical cable of Example 17 has a lower NA and thus exhibits a relatively unfavorable bending characteristic. While the core diameter is 50 μm in Example 17, this is not a direct cause of its unfavorable bending characteristic. As mentioned above, the upper limit for NA, which is determined by restrictions in manufacture, is 0.45.

Optical fibers are more likely to rupture when bent as their glass parts have a greater diameter. The HPCF having a cladding diameter of 125 μm is superior to the AGF having the same cladding diameter in terms of the resistance to rupture. In the optical cable of Example 16, the optical fibers are HPCFs each having a glass part with a diameter of 200 μm, at which the rupture resistance characteristic becomes unfavorable.

Figure 13:
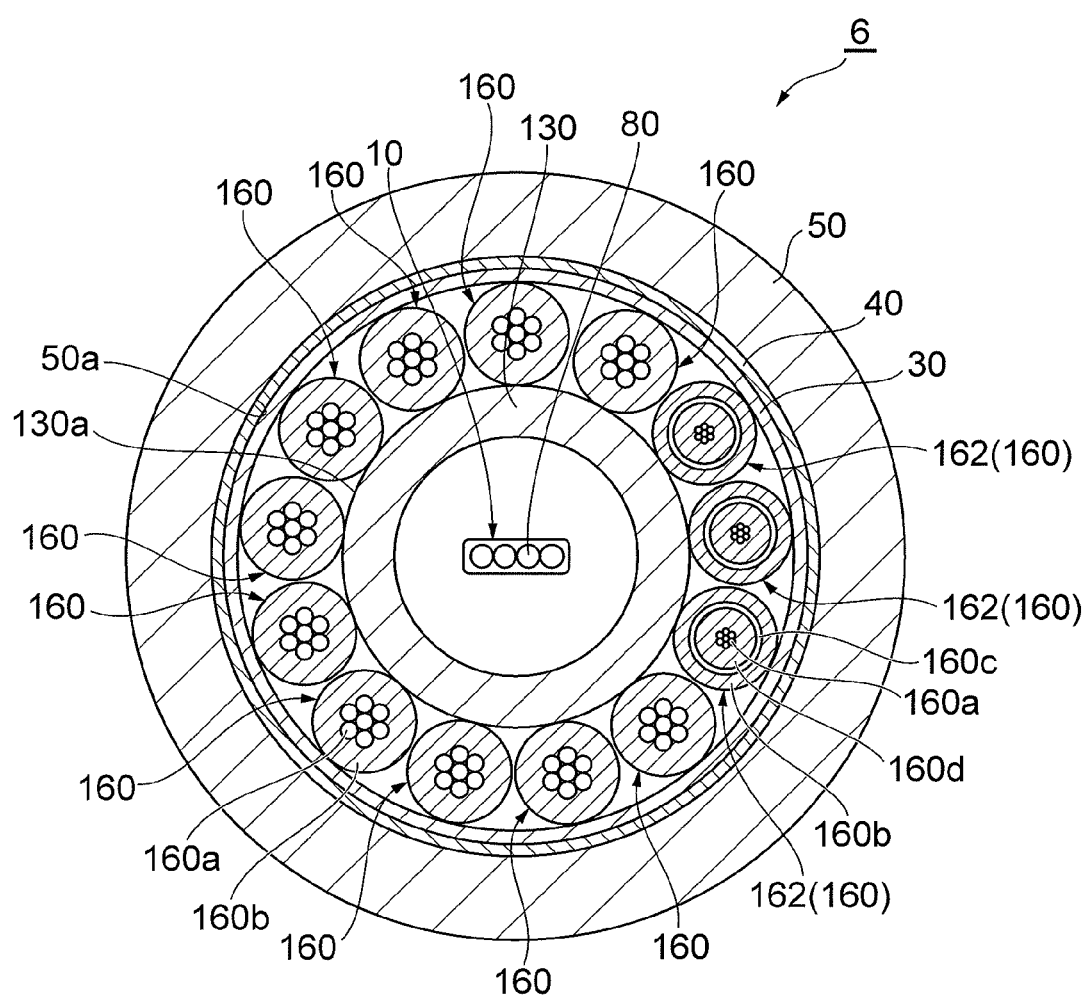
FIG. 13 is a sectional view illustrating the structure of an optical cable.

Examples carried out by using the optical cables 4, 5 of the above-mentioned fourth and fifth embodiments and optical cables 6, 2 as examples having no tension members arranged in tubes will now be explained. FIG. 13 is a cross-sectional view illustrating the structure of the optical cable 6 as an example for showing whether or not the stiffness of optical fibers caused by stretching of the tension member can be reduced. The optical cable 6 illustrated in FIG. 13 differs from the optical cable 4 of the fourth embodiment in that the tension member 30 is not arranged on the inside but outside of the tube 130. The examples illustrated in FIGS. 13 and 6, which are examples for showing whether or not the increase in transmission loss under external impact and the stiffness of optical fibers caused by stretching of the tension member can be reduced, are included in the scope of the present invention. The optical cable 2 illustrated in FIG. 6 also differs from the optical cable 5 of the fifth embodiment in that the tension member 30 is not arranged on the inside but outside of the tube 130.

FIGS. 14 to 16 are charts listing detailed structures of the optical cables 4, 5 used in Examples 21 to 34 and evaluation results concerning their impact tests, tensile strength tests, bending tests, compressive strength tests, pinch tests, initial optical characteristics, and optical cable stiffness. FIG. 17 is a chart listing detailed structures of the optical cables 6, 2 used in Examples 35 to 37 and their evaluation results. FIGS. 14 to 17 represent the structure of the sheath 50 by its outer and inner diameters, the structure of the tube 130 by its outer and inner diameters, and the structure of the tension member 30 by its amount and $S_{Te}/S_{Tu}$ (where $S_{Te}$ is the area of the tension member 30 in a cross section perpendicular to the central axis, and $S_{Tu}$ is the internal area of the tube 130 in the cross section). They also represent the structure of the optical fiber 80 by its type, numerical aperture (NA), core diameter, cladding diameter, primary diameter, secondary diameter, and ink diameter (i.e., the outer diameter of the color layer). They also represent the structure of the optical fiber ribbon 10 by its width and thickness.

In FIGS. 14 to 16, cable structures 1A and 1C represent the structures of the optical cables 4 and 5 in accordance with the fourth and fifth embodiments, respectively. In FIG. 17, cable structures 1E and 1F represent the structures of the optical cables 6 and 2 illustrated in FIGS. 13 and 6, respectively.

In these examples, a vertical cavity surface emitting laser (VCSEL) having a 20-μm square light emission area was used as a light entrance part for making light incident on one end of the optical fibers 80. A photodiode (PD) having a 100-μm square light-receiving region was used as a light detection part for detecting light emitted from the other end of the optical fibers 80.

In FIGS. 14 to 17, evaluations concerning the impact tests, tensile strength tests, bending tests, compressive strength tests, pinch tests, initial optical characteristics, and optical cable stiffness were performed under their corresponding conditions and standards which will follow. In the following evaluation standards, "good" and "fair" indicate those favorable in terms of reliability and practically usable, respectively, and the optical cables are preferably evaluated "good" or "fair."

Impact Test: A weight of 2 kg having a leading end with a radius of curvature of 12.5 mm was dropped from the height of 15 cm twice at the same location of the optical cable, and the increase in transmission loss [dB] between therebefore and thereafter was determined and evaluated under the following standards:
Good: less than 0.5 dB
Fair: at least 0.5 dB but less than 2.0 dB.
Poor: at least 2.0 dB or fiber rupture
Tensile Strength Test: The optical fibers 80 and the tension member 30 were integrated with an adhesive at both ends of the optical cable, and the transmission loss [dB] occurring when the tension member 30 was pulled at both ends by a force of 100 N was measured and evaluated under the following standards:
Good: less than 0.5 dB
Fair: at least 0.5 dB but less than 2.0 dB
Poor: at least 2.0 dB
Bending Test: The transmission loss [dB] between before and after winding 10 turns of the optical cable about a cylindrical mandrel having a radius of 5 mm was measured and evaluated under the following standards:
Good: less than 0.5 dB
Fair: at least 0.5 dB but less than 2.0 dB
Poor: at least 2.0 dB
Compressive Strength Test: The transmission loss [dB] between before and after applying a load of 350 N laterally to the optical cable by using a cylindrical mandrel having a diameter of 60 mm was measured and evaluated under the following standards:
Good: less than 0.5 dB
Fair: at least 0.5 dB but less than 2.0 dB
Poor: at least 2.0 dB
Pinch Test: The optical cable was bent by 180 degrees at one location and held in this state, and the time elapsed until the optical fiber 80 ruptured was measured and evaluated under the following standards:
Good: at least one month
Fair: at least one week but less than one month
Poor: less than one week
Initial Optical Characteristic: The initial transmission loss of the optical fiber 80 within the optical cable was measured by an optical pulse tester (OTDR at a wavelength of 850 nm). As a dummy fiber, a measurement fiber having a length of 1 km was used. The evaluation standards were as follows:
Good: less than 10 dB/km
Fair: at least 10 dB/km but less than 20 dB/km
Poor: at least 20 dB/km
Optical Cable Stiffness: The minimal radius of curvature at which the optical cable was able to be bent (the radius beyond which the stiffness of the optical cable prevented it from being wound up) when taking up 20 turns of the optical cable was measured. Its evaluation standards were as follows:
Good: less than 3 cm
Fair: at least 3 cm but less than 10 cm
Poor: at least 10 cm Referring to FIGS. 14 to 17, since the tension member 30 was arranged within the tube 130, Examples 21 to 34 yielded favorable results in the impact tests and optical cable stiffness. By contrast, since no tension member 30 was arranged within the tube 130, Examples 35 and 36 did not yield favorable results in the impact tests, whereby the optical fibers ruptured. The stiffness of the optical cable was not favorable in Example 37.

Examples 21 to 34 were seen to yield such favorable results in the impact tests as to exhibit sufficient buffer effects, since $S_{Te}/S_{Tu}$ was at least 5% in all of them. Examples 21 to 34 were also seen to yield such favorable results in the bending tests that the optical fiber ribbons were twistable so as to suppress the transmission loss caused by bending the optical fibers 80, since $S_{Te}/S_{Tu}$ was not more than 80% in all of them.

Examples 21 to 32 and 34 were seen to yield such favorable results in the tensile strength tests as to effectively suppress the increase in transmission loss caused by stretching of optical fibers when the optical cable was pulled, since the amount of tension member was at least 500 d.

Examples 21 to 32 and 34 were seen to yield such favorable results in the bending tests as to keep the bending loss sufficiently low, since the numerical aperture of the optical fibers was at least 0.25 in all of them.

Examples 21 to 34 were seen to yield such favorable results in the compressive strength tests as to suppress the increase in transmission loss under lateral pressures, since a plurality of optical fibers 80 constructed the optical fiber ribbon 10.

The optical cable in accordance with the present invention can be modified in various manners without being restricted to the above-mentioned embodiments.

What is claimed is:

1. An optical cable comprising:
   an optical fiber ribbon having a plurality of optical fibers arranged in parallel and integrated; and
   a sheath surrounding the optical fiber ribbon;
   wherein one optical fiber ribbon is arranged twistably within an inner space surrounded by the sheath,
   each of the plurality of optical fibers has a glass part with a diameter smaller than 100 μm,
   the optical cable does not rupture when the optical cable is bent by 180 degrees at one location and held in this state for one week, and
   a transmission loss between before and after applying a load of 350 N laterally to the optical cable by using a cylindrical mandrel having a diameter of 60 mm, is less than 2.0 dB.

2. An optical cable according to claim 1, further comprising a tension member disposed around the optical fiber ribbon.

3. An optical cable according to claim 2, further comprising an inner tube disposed on the inside of the sheath;
   wherein the tension member is disposed between the inner tube and the sheath; and
   wherein one optical fiber ribbon is twistably inserted in an inner space of the inner tube.

4. An optical cable according to claim 3, further comprising a conductive wire disposed on the outside of the inner tube.

5. An optical cable according to claim 2, further comprising an electromagnetic shield layer disposed between the tension member and the sheath.

6. An optical cable according to claim 2, further comprising a tube for containing the optical fiber ribbon and the tension member;
   wherein the tension member is arranged along the optical fiber ribbon, while the sheath surrounds the tube.

7. An optical cable according to claim 6, wherein the area occupied by the tension member in a cross section perpendicular to a central axis of the optical cable is at least 5% but not more than 80% of the internal area of the tube in the cross section.

8. An optical cable according to claim 7, wherein the area occupied by the tension member in the cross section perpendicular to the central axis of the optical cable is at least 10% but not more than 60% of the internal area of the tube in the cross section.

9. An optical cable according to claim 6, wherein a value obtained by dividing the amount of the tension member by the internal area of the tube in the cross section perpendicular to a central axis of the optical cable is at least 650 d/mm$^2$ but not more than 10400 d/mm$^2$.

10. An optical cable according to claim 9, wherein the value obtained by dividing the amount of the tension member by the internal area of the tube in the cross section perpendicular to the central axis of the optical cable is at least 1300 d/mm$^2$ but not more than 7800 d/mm$^2$.

11. An optical cable according to claim 6, wherein the amount of the tension member is at least 500 d but not more than 30000 d.

12. An optical cable according to claim 6, further comprising an electromagnetic shield layer disposed between the sheath and the tube.

13. An optical cable according to claim 6, further comprising one or a plurality of electric wires arranged between the sheath and the tube.

14. An optical cable according to claim 13, wherein at least one of the one or plurality of electric wires is a coaxial electronic wire.

15. An optical cable according to claim 1, wherein each of the plurality of optical fibers has a numerical aperture of at least 0.25 but not more than 0.45.

16. An optical cable according to claim 1, wherein each of the plurality of optical fibers has a core diameter of at least 60 μm but not more than 100 μm.

17. An optical cable according to claim 1, wherein each of the plurality of optical fibers includes a core and a cladding surrounding the core; and
    wherein the core and the cladding are constituted by glass and a plastic, respectively.

18. An optical cable according to claim 17, wherein the plurality of optical fibers further include a color layer arranged on an outer periphery of the cladding.

* * * * *